United States Patent

Kanngiesser et al.

[15] 3,707,669
[45] Dec. 26, 1972

[54] METHOD OF REGULATING HIGH VOLTAGE DIRECT CURRENT TRANSMISSION SYSTEM OPERATING WITH SEVERAL CONVERTER STATIONS CONNECTED IN A MULTIPOINT NETWORK

[72] Inventors: Karl-Werner Kanngiesser, Viernheim; Hans Peter Lips, Schriesheim, both of Germany

[73] Assignee: Aktiengesellschaft Brown, Boveri & Cie, Baden, Switzerland

[22] Filed: Jan. 27, 1971

[21] Appl. No.: 110,005

Related U.S. Application Data

[63] Continuation-in-part of Ser. No. 51,049, June 30, 1970, abandoned.

[30] Foreign Application Priority Data

July 4, 1971 Germany..................P 19 33 943.6

[52] U.S. Cl. .............................321/11, 321/5, 321/27
[51] Int. Cl. ..............................................H02m 1/18
[58] Field of Search..........................321/2, 11-14, 27, 321/38, 18

[56] References Cited

UNITED STATES PATENTS

| | | | |
|---|---|---|---|
| 3,038,112 | 6/1962 | Foss | 321/14 X |
| 3,470,442 | 9/1969 | Ainsworth | 321/2 |
| 2,866,148 | 12/1958 | Forssell | 321/2 |
| 3,036,257 | 5/1962 | Uhlmann | 321/14 X |
| 3,275,838 | 9/1966 | Almstrom | 307/82 |
| 3,467,848 | 9/1969 | Ainsworth | 321/38 X |
| 3,526,780 | 9/1970 | Uhlmann et al. | 307/82 |

Primary Examiner—William M. Shoop, Jr.
Attorney—Pierce, Scheffler & Parker

[57] ABSTRACT

In a high voltage d-c transmission system having more than two converter stations for establishing a multipoint power supply, the stations working in rectifier and inverter operation respectively at opposite ends of the transmission line are provided with the usual current, voltage and extinction angle regulators which operate, under normal conditions in the system, along a certain characteristic curve. In the event of a short-circuit in the d-c mains, the station regulators are changed over for operation along a different characteristic curve with reduced nominal current and voltage values in order to support the cut-off process of the d-c switches.

11 Claims, 11 Drawing Figures

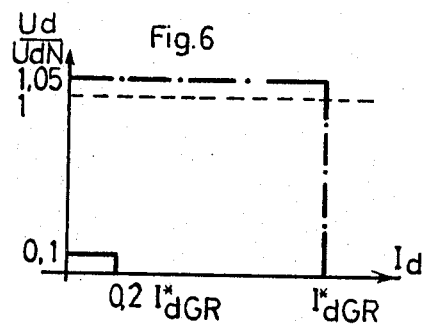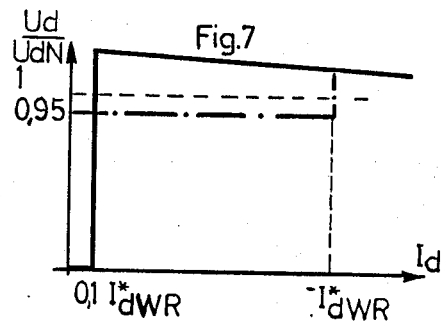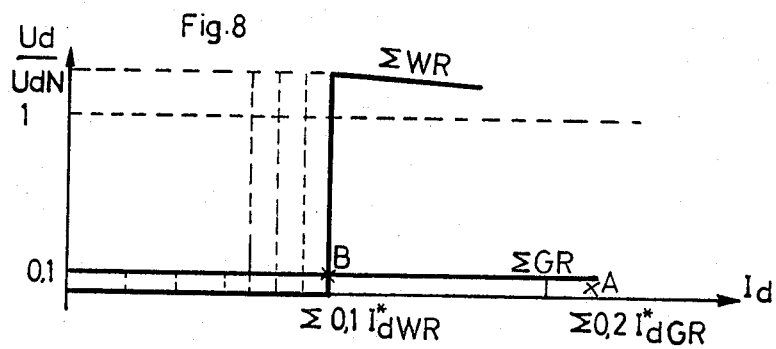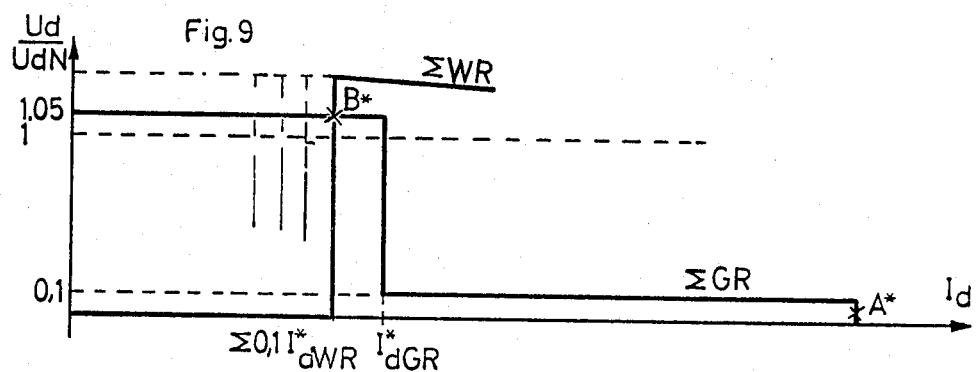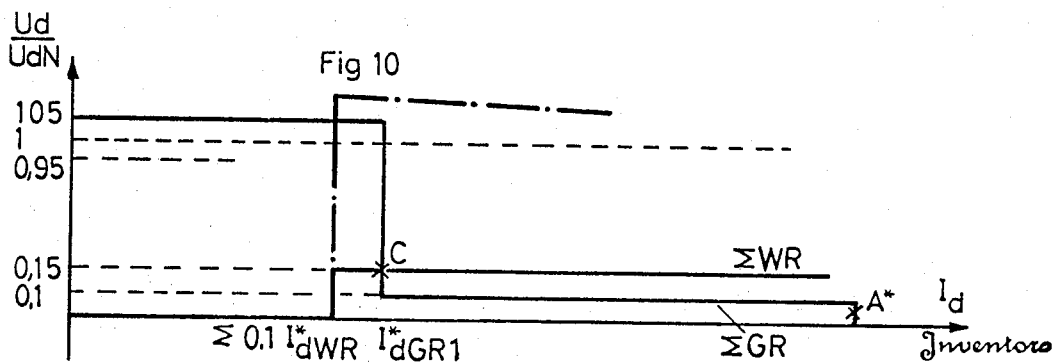

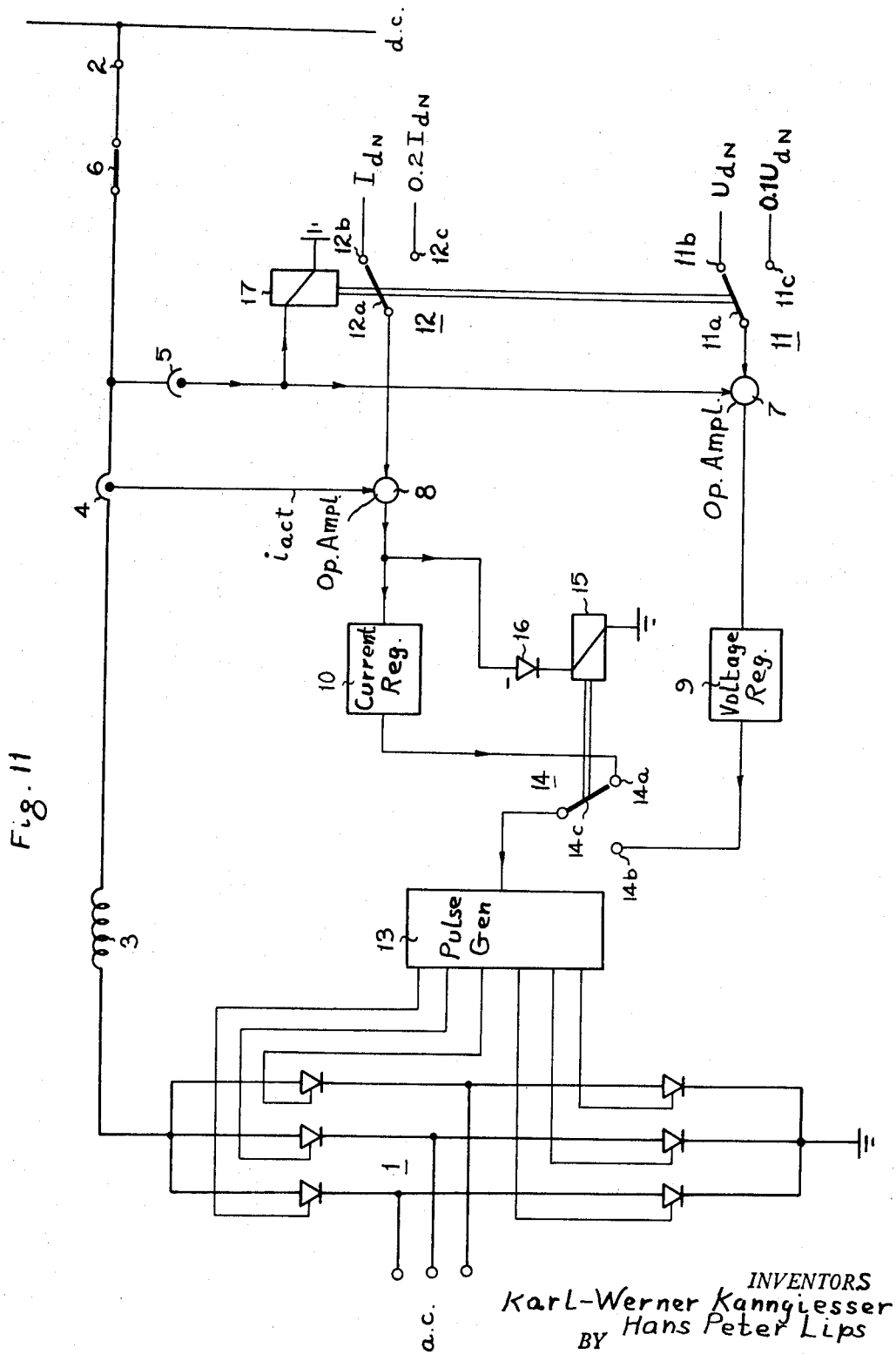

METHOD OF REGULATING HIGH VOLTAGE DIRECT CURRENT TRANSMISSION SYSTEM OPERATING WITH SEVERAL CONVERTER STATIONS CONNECTED IN A MULTIPOINT NETWORK

This invention relates to a method of and apparatus for regulating a high voltage d-c transmission system with more than two converter stations for multipoint-mains power supply which is to be used to support the disconnecting operation of d-c switches in case of trouble, and is a continuation-in-part of our application Ser. No. 51,049, filed June 30, 1970 and now abandoned.

In order to be able to ensure the economical and operative advantages of high-voltage d-c transmission systems for multipoint mains power supply it is necessary to provide a regulating equipment which acts not only in the normal case with variable load distribution, but also in case of trouble in such a way that a power failure of the mains is avoided under any circumstances. Similar as in three-phase mains, switches will be used for cuting off damaged lines or mains sections. But the cutoff conditions are much more difficult because of the absence of a natural current zero point in the d-c system. The regulating devices of the converter stations can only help to substantially facilitate the cutoff conditions if they are correspondingly designed.

As a regulating system for such multipoint mains has already been suggested the so-called limiting voltage method (PA P 15 – 88 067). The essential ideas are summarized below:

The operating behavior of a high-voltage d-c transmission system for multipoint mains which consists of several converter stations, becomes obvious when their individual voltage-current characteristics are superposed to summation characteristics. A unique, possibly right-angled intersection of the summation-characteristics of the rectifier-and inverter stations is of paramount importance for the stable operation of the system. This intersection of the summation characteristics determines the working point of the entire mains.

The following consideration is based on a hypothetical case looking far into the future. We assume that the multipoint system consists of 10 rectifier-and 10 inverter stations with a rated power of 1600 MW each at a mains voltage of ± 400 kV and a rated station current of 2000 A. In order to permit a change of direction of the energy, it is assumed that each station is equipped with a current-, a voltage- and an extinction angle regulator and is connected over pole changing switches to the d-c system.

The characteristics of the individual converter stations are shown in FIGS. 1 to 4.

FIG. 1 shows the characteristic of a current-regulating rectifier whose current regulator limits the station current to the value $I^*_d$ and whose voltage regulator is set to the nominal value of 1.05 $U_{dN}$, for example, when the system voltage is $U_{dN}$, hence out of engagement.

FIG. 2 shows the characteristic of a voltage-regulating rectifier which carries, when all stations of the system are in operation with their rated current, a resulting current between the limits $I^*_{d\ max}$ and $I^*_{d\ min}$ and which determines the rated voltage of the plant by means of its voltage regulator, which has in this range the nominal value $U_{dN}$. Its current regulator, which takes over the function of the current limitation in case of troubles, has the nominal value $I^*_{d\ max}$ and is out of engagement.

Figure 1:
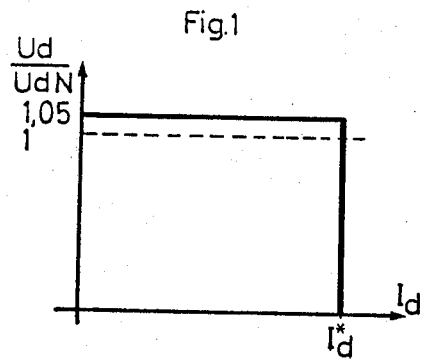
Figure 2:
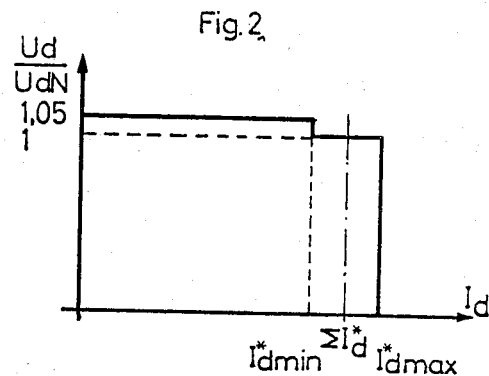
Figure 3:
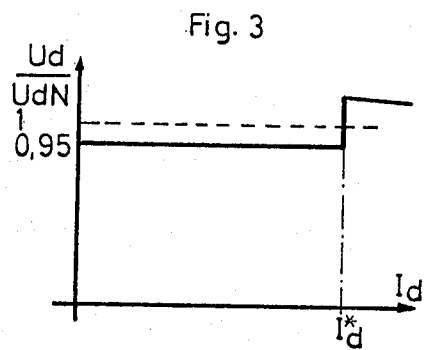
FIG. 3 shows the characteristic of a current-regulating inverter whose voltage regulator has the nominal value of 0.95 $U_{dN}$, for example, hence is in normal operation out of engagement, and whose current regulator has the nominal value $I^*_d$.
Figure 4:
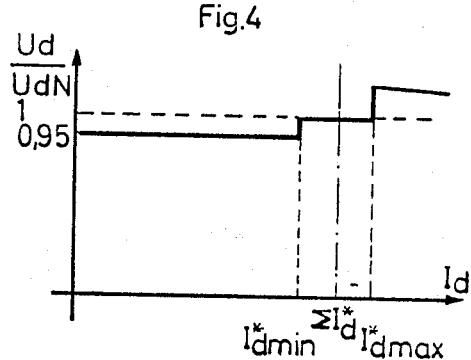
FIG. 4 shows the characteristic of a voltage-regulating inverter, which can have in principle likewise the function of voltage determination. The behavior of the total system, however, is independent of the type of operation of the voltage-determining station, so that this case of the inverter station will not be considered below.
Figure 5:
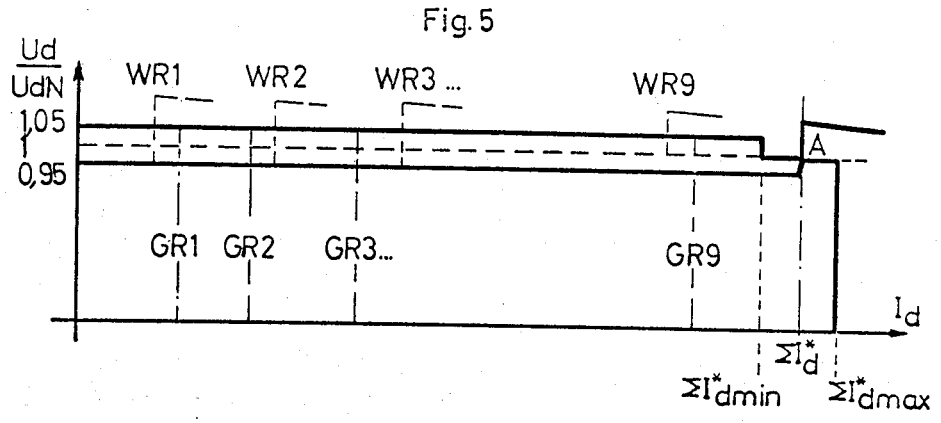

The summation characteristics in multipoint mains power supply are shown in FIG. 5. The mains voltage is determined by a predetermined converter station 10 by means of its voltage regulator, whose nominal value is set to the rated voltage. The rectifier station 10 has a characteristic according to FIG. 2, while the other rectifier stations 1 to 9 have characteristics according to FIG. 1. The summation characteristics of the inverter stations 1 to 10 according to FIG. 3 intersects the summation characteristic of the rectifier stations 1 to 10 in the working point A. The current regulator of the voltage-determining rectifier station 10 is out of engagement, since its nominal value is higher by the safety margin $\Sigma I^*_{d\ max} - \Sigma I^*_d$ than results from the mains condition: sum of all currents equals zero. The nominal values of the voltage regulators in the stations working as rectifiers are set, for example, to 1.05 $U_{dN}$, hence higher, and the nominal values of the voltage regulators in the stations working as inverters to 0.95 $U_{dN}$, for example, hence lower than the nominal value of the voltage-determining station. Due to this measure, a variation of the mains voltage, for example, in the case of a power failure in a station, beyond the set limiting value is avoided. The summation current, which is fed into the d-c system, for example, in the case of a short circuit, cannot rise beyond the predetermined maximum value $\Sigma I^*_{d\ max}$, due to the current-limiting characteristics of the rectifier stations. When the current taken from the d-c mains by the inverter stations drops below the minimum current value $\Sigma I^*_{d\ min}$, the full voltage value of the voltage-determining d-c station 10 is switched to the same nominal value of the remaining stations of the same type of operation, hence to 1.05 $U_{dN}$, for example. The station 10 thus loses its voltage-regulating function and participates on an equal basis in the current supply together with the other rectifier stations until the normal operation is restored, the voltage being at 1.05 $U_{dN}$. Despite equal nominal voltage values, a clear division of the station currents by the line resistances is ensured.

The advantage of the above described limiting voltage method is that the continuous operation of the multipoint mains can be maintained despite the failure of some stations, even if the nominal current values are not switched immediately according to the new circumstances. The requirement corresponding to the mains condition: sum of all currents equals zero, is satisfied even in the case of trouble, since the currents received and given respectively are set again corresponding to the proportional mains resistances. Overloading of the individual stations is impossible, since their current regulators limit the station currents to a given maximum value.

In the above described regulating method, each short circuit on the d-c side, for example, also tipping of inverters and arc-through, will lead immediately to a reduction of the d-c voltage in the feeding rectifier stations. The short circuit current is then limited to the size of the previously flowing rectifier currents. In order to be able to separate the damaged parts of the mains, the total mains can be made currentless, for example, for a short time :the energy stored in the reactances of the mains is returned to the three-phase mains over the rectifiers switched to inverter operations. The inverter stations go out of operation corresponding to their characteristic. In this currentless state, the cutoff can be effected, for example, by means of quick cutoff switches. The brief disconnection of the entire high voltage d-c transmission system results, however, in a peak load for all connected three-phase mains which can lead to instabilities. Besides, the reliable determination and remote signaling of the absence of current in the lines added at this moment by the cutout switches is technically complicated and risky. For the control of these faults and also for switching operations in normal operation the use of a high voltage d-c transmission switch has therefore advantages over the disconnection by means of grid controls in connection with quick cutout switches.

If a short circuit appears in a multipoint mains regulated according to the above described limiting voltage method, the energy contained in the capacities is returned immediately to the three-phase mains, but the energy contained in the inductances is not reduced at first, because the remaining rectifiers stations will keep their current constant according to the given nominal value. The voltage in the rectifier stations is determined by the voltage drop on the proportional mains resistance between the short circuit point and the rectifier station in question. In this quasi-stationary state, determined by the regulation, the sum of all rectifier currents flows into the short circuit point. The high-voltage d-c transmission switch must be dimensioned for this summation current. The voltage stress of the switch is at first low, since the voltage to be cut off is of the order of 10 percent of the rated voltage. When the switch starts its switching operation, it builds up a countervoltage to produce a current zero point. Of advantage is in this case a switch which produces a countervoltage that is to a great extent independent of the current. The countervoltage of the high voltage d-c transmission switch effects a reduction of the currents supplied by the current-regulated rectifiers. Without additional measures in the regulating equipment, the grid control will act so that the voltage is constantly increased in the rectifier stations in order to be able to maintain the given nominal current value.

The adverse result of this natural regulating behavior for the high voltage d-c transmission switch is that it finally must be cut off against the full mains voltage as recovery voltage. According to the present state of technology, however, a switch with such a voltage stress is not available, and it will be much more costly than a switch which can only disconnect at reduced voltage.

The object of the invention is to manage, even with extended d-c mains, with a d-c switch whose breaking current is of the size of the rated current at a recovery voltage which is far below the mains voltage (load switch).

This problem is solved according to a method of control for HVDC systems of the above type in that the station regulators are switched in the case of a short circuit in the d-c mains to a characteristic curve with reduced nominal voltage-and current values, compared to the normal operation, in order to support the disconnecting operation of d-c switches. This solution is of particular advantage when the current-and voltage regulators are laid out for a regulation according to the limiting voltage method. But it is pointed out explicitly that the limiting voltage method is not a necessary prerequisite for the method according to the invention. Even in a regulating method which has, for example, no voltage regulation or-limitation in normal operation, characteristics with reduced nominal values of current-and voltage regulator can be made effective according to the invention in case of trouble by switching.

The method according to the invention will be described below on the basis of an embodiment with reference to FIGS. 6 to 10 and going back to the limiting voltage method.

The nominal current values of the rectifier stations are preferably switched, for example, to $0.2\ I_{dN}$ and the nominal voltage values of the rectifier stations are switched, for example, to $0.1\ U_{dN}$ (FIG. 6).

An improvement of the behavior after elimination of the fault is achieved according to another feature of the invention by switching the current regulator of the inverter stations for the nominal current value to a nominal value of $0.1\ I_{dN}$ for example, while their voltage regulator is switched at the same time to a nominal value of $U^*_d = 0$ (FIG. 7).

In order to achieve a good adaptation of the switching of the regulator characteristics according to the invention to the respective mains conditions, the nominal current-and voltage values, which are changed in the case of trouble, as well as the nominal values of the minimum current superimposition can be adapted to the nominal data of the available high voltage d-c transmission switches.

As an example of a multipoint mains we use here again the above mentioned embodiment with 10 rectifier-and 10 inverter stations with a power of 1600 MW each. The nominal voltage is assumed with ± 400 kW, the rated station current with 2000 A. All stations are again assumed as equipped with a current-, voltage-and extinction angle regulator each. It is furthermore assumed that the station regulators work satisfactorily and that the connected three-phase mains does not influence the processes on the d-c side and vice versa. Furthermore it is assumed that the measuring device for determining the fault and the switching of the characteristics in case of trouble according to the invention work properly.

The compensating processes in the d-c mains, particularly with consideration of the switching of the regulator characteristics, will not be considered here, since these are rapid processes which can anyway no longer be determined with the high voltage d-c transmission switch. For the evaluation of the faults suffices therefore the examination of the "quasistationary state."

We will now consider the case where a short circuit appears for some reason in an inverter station. All inverter stations go out of operation corresponding to their characteristic and all rectifier stations feed with their rated current to the fault because they keep their current constant according to the given nominal value. The high voltage d-c transmission switches can not withstand this load of 10 × 2000 A = 20,000 A.

According to the invention, the nominal current values of the rectifier stations are switched to 0.2 $I_{dN}$, for example, after the short circuit has been determined by the measuring device, and the resulting summation current of 10 × 0.2 × 2000 A = 4000 A can be handled by the switch.

On the station terminals is now a correspondingly low voltage, as it can be seen from the summation characteristic in FIG. 5. The working point A is established. At this moment, the high voltage d-c transmission switches in the faulty line section. The increase of the terminal voltage in the rectifier stations as a reaction to the increasing countervoltage of the switch is suppressed as soon as the nominal voltage switched according to the invention to 0.1 $U_{dN}$, for example, has been attained. The recovery voltage on the switch cannot become higher tan 0.1 × 400 kV = 40 kV, that is, the limit of the voltage stress of the switch is clearly determined. It can now terminate the cutoff process with the voltage kept constant.

In the course of this cutoff process, the summation short circuit-current will drop to the minimum current $I^*_{dWR\ min}$ given by the inverter stations. Because the current regulators of all inverter stations are in engagement so that a load exchange takes place with reduced current (0.1 $I_{dN}$) and reduced voltage (0.1 $U_{dN}$), while the line or station where the short circuit occurred is disconnected.

We obtain the working point B according to FIG. 8. After the final cutout — if necessary by an additional break contact — the regulators can be switched to their original characteristics and the multipoint mains resumes its normal operation, naturally without the faulty inverter.

If the short circuit occurs in a rectifier or in any line section of a looped high voltage d-c transmission mains, the course of the fault and the restoration of the normal operation will be as described above; only the load distribution after resumption of the operation will be different.

Another fault is the failure of an inverter bridge. If one half of the station consists of two bridges, the voltage in the inverter will drop to half, in our example to + 200 kV. The other inverters go out of operation while the rectifiers drop their voltage, but maintain their rated current according to the nominal current value. The remaining inverter bridge would be overloaded and must be disconnected. This is done by zero modulation of the inverter or by the sequential ignition of valves, which results in the current supply to two valves connected to a common phase so that a short circuit is practically started. This fault has thus been traced back to a short circuit in the inverter and the disconnection of the branch is effected by means of the high voltage d-c transmission switch as described above.

Contrary to the assumption made in the above described faults, namely that the switching of the characteristics according to the invention works properly in the case of a fault, we will now assume a fault in the automatic system switching of a rectifier, that is, a rectifier maintains in case of a short circuit in the d-c mains its original regulating characteristic (FIG. 6, dot-dashed). The fault where only one of the two nominal values of voltage or current is not properly switched need not be considered, since it is very simple to prevent in such a case the switching completely or to put the faulty station out of operation. The resulting summation characteristics of the rectifiers and inverters are shown in FIG. 9. We assume that the rectifier 1 is faulty, that is, it maintains the nominal values 1.05 $U_{dN}$ and $I^*_{dGR1}$, while the other 9 rectifiers work with a changed characteristic. If the high voltage d-c transmission switch now starts its cutoff operation, the voltage on the rectifier 1 can rise unhindered, while the voltage on the rectifiers 1–9 remains constant according to the invention when the lower voltage of 0.1 $U_{dN}$, for example, has been attained. The result would be that the 9 rectifiers go out of operation and that the switch would have to disconnect against the full mains voltage as recovery voltage. The desired working point B in FIG. 8 could thus no longer be produced and the disconnection by means of the high voltage d-c transmission switch must not take place. In a further development of the invention, overloading of the high voltage d-c transmission switch is to be avoided in this case too.

This problem is solved in this way that an additional maximum voltage regulator is started, which prevents a voltage rise beyond a certain value, for example, 0.15 $U_{dN}$ (FIG. 10). The recovery voltage on the switch can now be no more than 0.15 $U_{dN}$, for example, and a proper disconnection is ensured. The rectifier 1 and the ten inverters can resume their operation at reduced load (working point C in FIG. 10).

If a fault occurs in the automatic switching system of an inverter, the disconnection of the high voltage d-c transmission switch can be effected without additional measures. If the switching of the nominal voltage value of an inverter of $U_{dN}$ to $U_{dN} = 0$ fails when the minimal current drops below 0.1 $I^*_d$ the intersection B in FIG. 8 is displaced by the corresponding amount 0.1 $I^*_d$ of the nominal minimum current value of one inverter, hence only slightly to the left. If the superimposition of an inverter maximum voltage regulator with a nominal value 0.15 $U_{dN}$ fails, the characteristic of the inverter in FIG. 8, and thus also the desired working point, do not change.

The switching of the nominal voltage value of the inverter according to FIG. 10 is unnecessary, provided Σ 0.1 $I^*_{dWR}$ is always by a certain safety margin greater than the maximum possible nominal current value of each individual rectifier $I^*_{dGR}$ of the high voltage d-c transmission mains. This condition is only satisfied, however, in multipoint mains with a great number of converter stations which have about the same station power. In a few stations of different power, the switching of the nominal voltage value of the inverter according to the invention ensures the necessary safety against overloading of the high voltage d-c transmission switch.

The switching of the regulator characteristics in the case of a short circuit according to the invention thus has the following advantages:

1. With a plurality of feeding rectifier stations, the quasistationary fault current can be kept so low that the admissible loading capacity of a high-voltage d-c transmission switch is not exceeded. In the 10 rectifier stations of our example, the fault current would only increase to $0.2 \times 10 = 2$-fold amount of the rated station current.

2. The recovery voltage of the switch is limited to an exactly defined value. A value of $0.1\ U_{dN} = 40\text{kV}$ corresponds to the assumptions of our example.

3. On the basis of the minimum current superimposition of the current regulators of the inverters, all stations absorb power even before their voltage increases again, so that insertion processes which can lead to instabilities of the three-phase mains are avoided.

4. Compared to the method of complete blockage of the rectifiers and the switching by means of cutout switches, the time until the energy stored in the inductances is completely exhausted and the absence of current in the line to be disconnected was measured and plotted can be saved.

5. The time until the mains voltage rises again can be selected freely corresponding to the requirements, resulting, for example, from the opening time of break contacts, which yield a high safety factor with a minimum of interruption time of the energy transmission.

A representative embodiment of the invention is illustrated in FIG. 11. Here it will be seen that 1 represents schematically one of a plurality of converter stations of known construction, i.e. a full wave rectifier bridge, each bridge being connected on the a.c. input side to a source of alternating current and on the d.c. output side to the direct current transmission line at terminal 2. The converter elements of the bridge are usually of the controllable semiconductor type, i.e., SCRs and their control electrodes receive firing pulses in the proper sequence from a controllable pulse generator 13 of known construction.

The d.c. side of the converter bridge 1 is connected to the high voltage d.c. transmission line by a circuit which includes a choke coil 3, the primary of a current transformer 4, the primary of a voltage transformer 5 and a power switch 6.

The output from the secondary side of current transformer 4 is applied as one of two inputs to a comparison device 8 which can be a transistorized dual input operational amplifier. The other input to amplifier 8 is the output side of a switch 12 which itself has two alternative input connections, one being $I_{dN}$ and the other $0.2I_{dN}$.

In a similar manner, the output from the secondary side of voltage transformer 5 is applied as one of two inputs to a comparison device 7, which also may be a transistorized dual input operational amplifier. The other input to amplifier 7 is the output side of a switch 11 which itself has two alternative input connections, one being $U_{dN}$ and the other $0.1U_{dN}$.

In the drawing, switches 11 and 12 have been illustrated in the form of mechanical switches being actuated simultaneously by a relay 17 for the sake of simplicity and clarity but typically would be of the electronic type whose actions are controlled jointly by the output from the secondary side of transformer 5. As illustrated, switch 11 has a movable contact member 11a which shifts between stationary contact 11b connected to $U_{dN}$ and stationary contact 11c connected to $0.1U_{dN}$. Similarly, switch 12 has a movable contact member 12a which shifts between stationary contact 12b connected to $I_{dN}$ and stationary contact 12c connected to $0.2I_{dN}$.

The output from operational amplifier 8 is applied as input to a current regulator 10 typically in the form of a conventional feedback amplifier, the output from the current regulator 10 being applied to one stationary contact 14a, of a switch 14. The output from operational amplifier 7 is applied as input to a voltage regulator 9 typically in the form of a feedback amplifier, the output from regulator 9 being applied to a second stationary contact 14b of switch 14. The movable contact member 14c of switch 14 is actuatable by a relay 15 controlled by a diode 16 that has its anode side connected to the output side of operational amplifier 8. Relay 15 thus serves to shift the movable contact member 14c between the two stationary contacts 14a, 14b so that either the output from the current regulator 10 or the voltage regulator 9 is connected to and controls operation of the SCR ignition pulse generator 13, i.e., the instant at which the pulse is applied in relation to the a.c. voltage wave being rectified or produced, i.e., the so-called firing angle.

The normal operating mode of the control circuit of FIG. 11 is as follows: Relay 15 is so controlled by diode 16 that switch 14 connects the output from the voltage regulator 9 when diode 16 is in a conducting state. In this case, the current difference value at the output of the difference amplifier 8 between the reference value $I_{dN}$ and the actual value $i_{act}$ of the station current has a positive polarity so that diode 16 is conducting. A positive polarity of the difference current signifies that the actual current value $i_{act}$ is all right so that current regulator 10 can be out of operation and pulse generator 13 at the converter station is regulated by voltage regulator 9. Thus, whenever diode 16 is in its conducting state, it actuates relay 15 to cause the movable contact 14c of switch 14 to engage stationary contact 14b so that the output of voltage regulator 9 is connected through switch 14 to the control input of the SCR ignition pulse generator 13.

In the opposite case, i.e., should the actual current value $i_{act}$ exceed the reference value $I_{dN}$, operation of the current regulator 10 is necessary to regulate the current of the converter station 1. In this case the current difference value at the output of difference amplifier 8 becomes negative so that diode 16 is in a nonconducting state and relay 15 functions to establish contact between the movable contact 14c and stationary contact 14a of switch 14 so that the output of current regulator 10 is applied through switch 14 to the control input of the SCR ignition pulse producer 13.

Also, in the normal operating mode of the FIG. 11 circuit, switches 11 and 12 will be in be positions depicted, i.e., with the movable contacts 11a and 12a engaged with stationary contacts 11b and 12b so that the respective reference values $U_{dN}$ and $I_{dN}$ feed through these switches to the operational amplifiers 7 and 8. However, in the event of a short-circuit condition at the converter station 1, the d.c. output voltage from the converter station is reduced, the effect of which is to lower the voltage output from transformer 5 which causes relay 17 to actuate switches 11 and 12 to the positions wherein the movable contacts 11a and 12a engage stationary contacts 11c and 12c so that the respective reference values $0.1 U_{dN}$ and $0.2 I_{dN}$ feed through these switches to operational amplifiers 7 and 8.

More particularly, in the event that a short-circuit condition arises at any of the converter stations, the system responds in the following manner.

The outputs of the operation amplifiers 7 and 8 which indicate the difference between the actual values and the reference values increase by reducing of the reference values so that an operation of this regulator is started which is applied to the ignition pulse generator 13. The output of this regulator controls the ignition pulse generator 13 in such a manner that the actual values of the station 1 will be approximated to the reduced reference values. After approximating the actual values, the damaged converter station can be cut off from the d.c. mains as described above.

We claim:

1. In the method of regulating a high voltage d-c transmission system having more than two converter stations for providing a multipoint power supply, and wherein the converter stations working in rectifier and inverter operation are provided with current, voltage and extinction angle regulators, the improvement wherein the station regulators are switched, in the event of a short-circuit in the d-c mains to a characteristic curve with reduced nominal current and voltage values as compared to the values utilized during normal operation, thereby to effect a support of the cut-off process of d-c switches.

2. The method of regulation, as defined in claim 1, for a high voltage d-c transmission system wherein said current and voltage regulators are designed for a regulation according to the limiting voltage method.

3. The method of regulation, as defined in claim 1, for a high voltage d-c transmission system and which includes the step of changing the nominal values of all rectifier current regulators from the original value to a lower value, such as $0.2\ I_{dN}$ in the event of a short circuit.

4. The method of regulation, as defined in claim 1, for a high voltage d-c transmission system wherein said current and voltage regulators are designed for a regulation according to the limiting voltage method and which includes the step of changing the nominal values of all rectifier voltage regulators from the original value to a lower value, such as $0.1\ U_{dN}$ in the event of a short circuit.

5. The method of regulation, as defined in claim 1, for a high voltage d-c transmission system and which includes the step of changing the current regulators of the inverter stations from their nominal value to a lower value, such as $0.1\ I_{dN}$, and the voltage regulators of the inverter stations from their nominal value to a value $U^*_d = 0$ so that they already resume their operation at reduced power during the cut-off process.

6. The method of regulation, as defined in claim 1, for a high voltage d-c transmission system wherein in the event of failure of one inverter station the further step is provided for protecting the remaining inverters of the same station against overload by deliberately causing a short-circuit in the faulty inverter station such as by zero modulation of the inverter or sequential ignition of two valves which are connected to a common phase.

7. The method of regulation, as defined in claim 1, for a high voltage d-c transmission system where, in order to avoid overloading of a high voltage d-c transmission switch in the event of a fault in the automatic switching system of a rectifier, the further step is provided of changing the characteristic of the inverter in the case of short circuit by inserting an additional maximum voltage regulator to prevent the voltage from rising above a certain value, such as $0.15\ U_{dN}$.

8. Arrangement for regulating a high voltage d-c transmission system comprising more than two converter stations interconnected by transmission links for providing a multipoint power supply, each said station comprising controllable valves controlled by the output of a firing pulse generator, a d-c current regulator, a d-c voltage regulator, each said d-c regulator being controlled respectively by the output of a corresponding comparison device which functions to effect comparisons respectively between actual and reference values of the d-c current and between actual and reference values of the d-c voltage, switching means for alternatively connecting the respective outputs of said d-c current and voltage regulators to the input of said firing pulse generator for controlling the latter and hence also the operation of the controllable valves of said converter station, said switching means normally connecting the output of said d-c voltage regulator to the input of said firing pulse generator under normal d-c current conditions at the converter station but being responsive upon an abnormal increase in said station current to switch the input of said firing pulse generator to the output of said d-c current regulator, means providing dual sources of reference values of the d-c current and voltage, each said dual source providing a normal reference value and a substantially lower-than-normal reference value, and switching means normally connecting said normal reference values of said d-c current and voltage as inputs respectively to said d-c current and voltage comparison devices but being responsive upon an abnormal increase in said station current to substitute said lower-than-normal reference values of said d-c current and voltage as the inputs to said d-c current and voltage comparison devices.

9. Arrangement as defined in claim 8 for regulating a high-voltage d-c transmission system wherein the actual value of the d-c current is produced by a current transformer inserted in the corresponding transmission link, and wherein the actual value of the d-c voltage is produced by a voltage transformer inserted in the corresponding transmission link.

10. Arrangement as defined in claim 8 for regulating a high voltage d-c transmission system wherein said switching means at each station for alternatively connecting the respective outputs of said d-c current and voltage regulators to the firing pulse generator of the station includes control means therefor comprising the output of a diode, said diode being connected to the input terminal for the d-c current regulator of the station and being rendered conductive so as to establish an output therefrom when said station current rises to an abnormal value resulting in an input to the d-c current regulator having a positive polarity.

11. Arrangement as defined in claim 9 for regulating a high voltage d-c transmission system and which includes switching means common to the d-c current and voltage reference value inputs to said comparison devices for simultaneously switching the d-c current and voltage reference values between their higher and lower levels, said switching means being controlled by the output of said d-c voltage transformer.

* * * * *